United States Patent
Park

(10) Patent No.: US 11,258,829 B2
(45) Date of Patent: Feb. 22, 2022

(54) METHOD AND DEVICE FOR SECURE COMMUNICATION USING PREDEFINED URL

(71) Applicant: N-TUPLE.CO.LTD, Seoul (KR)

(72) Inventor: Hyun-Min Park, Seoul (KR)

(73) Assignee: N-TUPLE.CO.LTD, Seoul (KR)

( * ) Notice: Subject to any disclaimer, the term of this patent is extended or adjusted under 35 U.S.C. 154(b) by 0 days.

(21) Appl. No.: 16/668,941

(22) Filed: Oct. 30, 2019

(65) Prior Publication Data

US 2020/0067990 A1 Feb. 27, 2020

Related U.S. Application Data

(63) Continuation of application No. 15/543,099, filed as application No. PCT/KR2016/000251 on Jan. 11, 2016, now Pat. No. 10,498,773.

(30) Foreign Application Priority Data

Jan. 12, 2015 (KR) .................. 10-2015-0004081

(51) Int. Cl.
*H04L 29/06* (2006.01)
*H04L 67/146* (2022.01)

(52) U.S. Cl.
CPC ........ *H04L 63/205* (2013.01); *H04L 63/0428* (2013.01); *H04L 63/10* (2013.01); *H04L 63/168* (2013.01); *H04L 63/18* (2013.01); *H04L 67/146* (2013.01)

(58) Field of Classification Search
CPC . H04L 63/205; H04L 63/0428; H04L 67/149; H04L 63/18; H04L 9/3271; H04L 63/168; H04L 63/10; H04L 67/146

USPC .......................................................... 713/156
See application file for complete search history.

(56) References Cited

U.S. PATENT DOCUMENTS

| | | | |
|---|---|---|---|
| 7,447,775 B1 | 11/2008 | Zhu et al. | |
| 7,769,820 B1 | 8/2010 | Spies et al. | |
| 8,745,710 B1 | 6/2014 | Roth et al. | |
| 8,768,838 B1 | 7/2014 | Hoffman | |
| 10,498,773 B2* | 12/2019 | Park ................ | H04L 63/0428 |
| 2002/0152384 A1 | 10/2002 | Shelest et al. | |
| 2004/0152511 A1 | 8/2004 | Nicely et al. | |
| 2005/0268107 A1 | 12/2005 | Harris et al. | |
| 2006/0168221 A1 | 7/2006 | Juhls | |
| 2006/0185021 A1 | 8/2006 | Dujari et al. | |

(Continued)

FOREIGN PATENT DOCUMENTS

| | | |
|---|---|---|
| KR | 10-0852145 B1 | 8/2008 |
| KR | 10-2013-0077204 A | 7/2013 |

(Continued)

*Primary Examiner* — Matthew T Henning
(74) *Attorney, Agent, or Firm* — Novick, Kim & Lee, PLLC; Sang Ho Lee

(57) ABSTRACT

A communication method is securely performed by a communication device having a predefined URL. The communication method includes transmitting a first request, receiving a second request transmitted to the predefined URL, determining whether the second request corresponds to the first request, transmitting a response for the second request according to a result of the determination, and receiving a response for the first request. This method makes it possible to easily build and manage a system.

7 Claims, 2 Drawing Sheets

(56) References Cited

U.S. PATENT DOCUMENTS

| | | | |
|---|---|---|---|
| 2008/0072295 A1* | 3/2008 | Borenstein | H04L 9/3215 |
| | | | 726/4 |
| 2009/0132808 A1 | 5/2009 | Baentsch et al. | |
| 2009/0287921 A1 | 11/2009 | Zhu et al. | |
| 2010/0024009 A1 | 1/2010 | Comay et al. | |
| 2010/0125635 A1* | 5/2010 | Axelrod | H04L 63/0838 |
| | | | 709/206 |
| 2010/0217981 A1 | 8/2010 | Jin et al. | |
| 2010/0318616 A1 | 12/2010 | Langley et al. | |
| 2011/0136510 A1 | 6/2011 | Peterson et al. | |
| 2012/0151047 A1 | 6/2012 | Hodges et al. | |
| 2013/0159188 A1 | 6/2013 | Andon et al. | |
| 2013/0205386 A1 | 8/2013 | Thompson et al. | |
| 2013/0212689 A1 | 8/2013 | Ben-Natan et al. | |
| 2013/0268632 A1 | 10/2013 | Baron et al. | |
| 2014/0037074 A1 | 2/2014 | Jose | |
| 2014/0068269 A1 | 3/2014 | Zhou | |
| 2014/0282950 A1 | 9/2014 | Roth et al. | |
| 2014/0304510 A1 | 10/2014 | Sannegowda | |
| 2014/0344575 A1 | 11/2014 | Saremi | |
| 2015/0302421 A1 | 10/2015 | Caton et al. | |
| 2015/0350179 A1 | 12/2015 | Kobayashi | |

FOREIGN PATENT DOCUMENTS

| | | | | |
|---|---|---|---|---|
| WO | WO-0163878 A1 * | 8/2001 | | G06F 21/6218 |
| WO | WO-2008039227 A1 * | 4/2008 | | H04L 9/3273 |
| WO | 2012/053135 A1 | 4/2012 | | |

* cited by examiner

[Fig. 1]
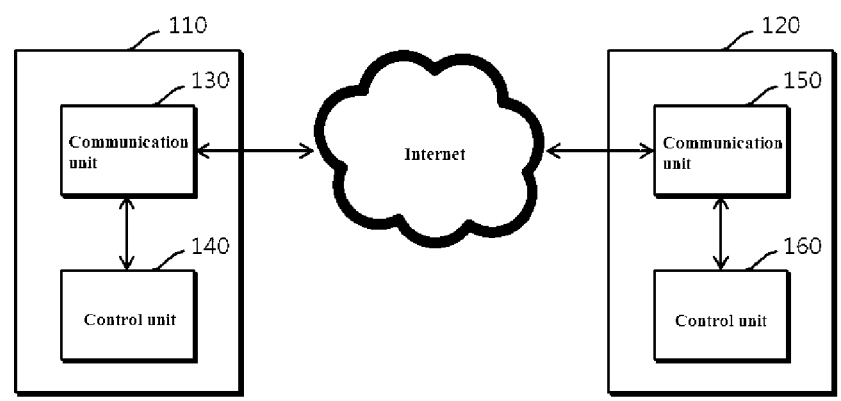
[Fig. 2]
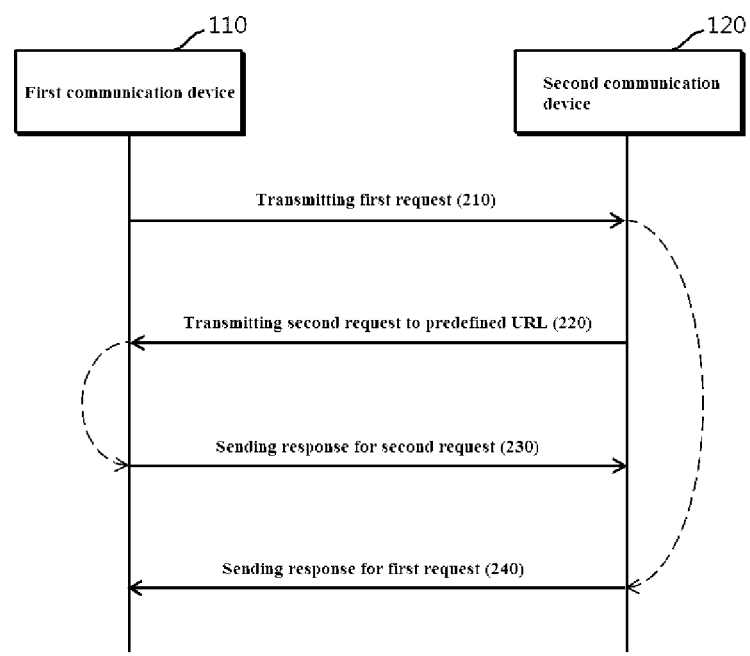

[Fig. 3]
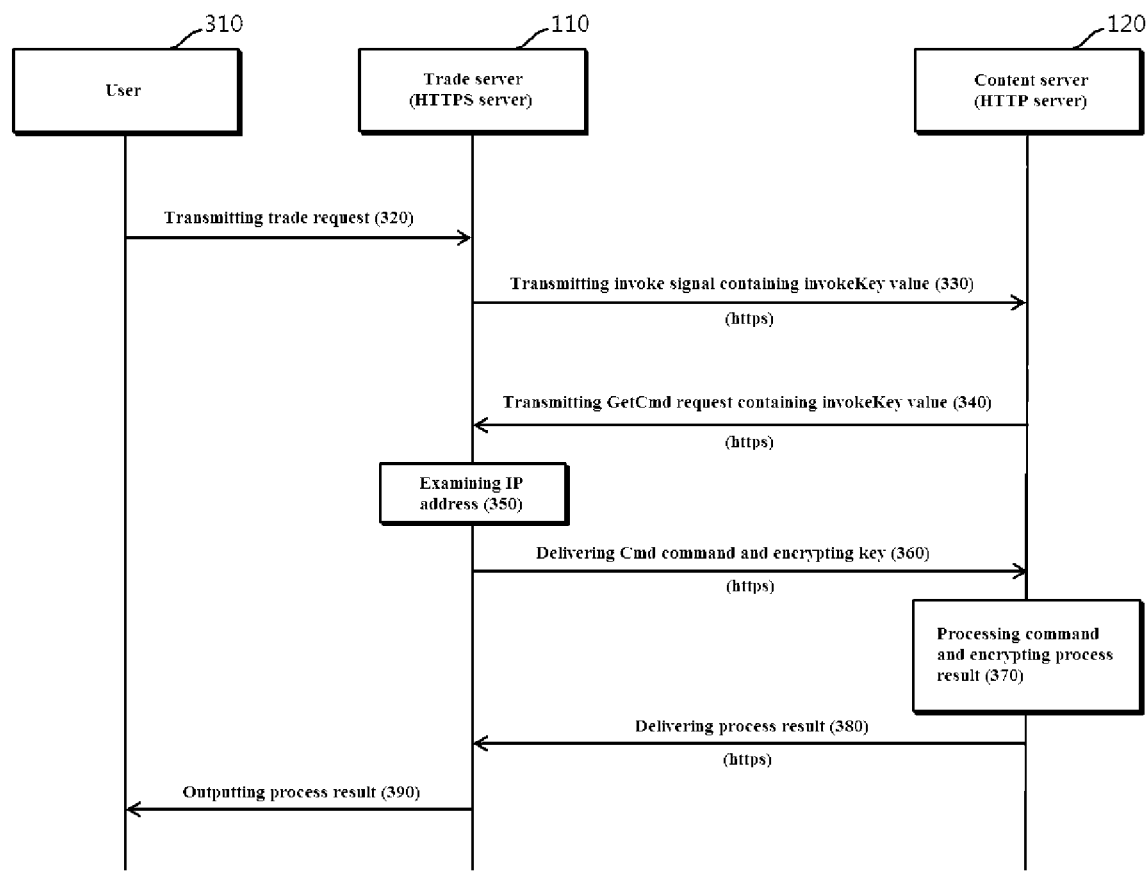

METHOD AND DEVICE FOR SECURE COMMUNICATION USING PREDEFINED URL

TECHNICAL FIELD

This application is based on and claims priority from Korean Patent Application No. 10-2015-0004081, filed on Jan. 12, 2015 with the Korean Patent Office, the disclosure of which is incorporated herein in its entirety by reference.

The present disclosure relates to a method and device for secure communication using a predefined uniform resource locator (URL).

BACKGROUND ART

In recent years, communication security techniques for enabling secure communication between computers have been developed along with the development of computer networks. Communication security techniques of the related art include a method using an SDK, a method using a security protocol such as HTTPS or the like, and an IP examination method. Since these communication security techniques are difficult to implement, high-quality manpower is required in building and managing a communication system. It is also time-consuming and costly to build and manage the communication system. Thus, a demand has existed for a communication security technique, which can be implemented easily and quickly.

DISCLOSURE OF INVENTION

Technical Problem

In order to solve the aforementioned problem, the present disclosure provides a method and device for secure communication using a predefined URL.

According to one embodiment of the present disclosure, there is provided a communication device having a predefined URL, including: a communication unit configured to transmit and receive data; and a control unit configured to transmit a first request via the communication unit, receive a second request transmitted to the predefined URL via the communication unit, determine whether the second request corresponds to the first request, transmit a response for the second request according to a result of the determination via the communication unit, and receive a response for the first request via the communication unit.

According to another embodiment of the present disclosure, there is a communication device provided, having a predefined first URL, including: a communication unit configured to transmit and receive data; and a control unit configured to transmit a first request via the communication unit, receive a second request transmitted to the predefined first URL via the communication unit, determine whether the second request is received from a predefined second URL and corresponds to the first request, transmit a response for the second request according to a result of the determination via the communication unit, and receive a response for the first request via the communication unit.

The control unit may be configured to transmit the first request containing a unique value and determine that the second request corresponds to the first request if the unique value is contained in the second request.

According to a further embodiment of the present disclosure, there is provided a communication device for performing communication with a counterpart device having a predefined URL, including: a communication unit configured to transmit and receive data; and a control unit configured to receive a first request via the communication unit, transmit a second request corresponding to the first request to the predefined URL via the communication unit, and transmit a response for the first request via the communication unit if a response for the second request is normally received.

The first request may contain a unique value and the control unit may be configured to transmit the second request containing the unique value.

The control unit may be configured to transmit the first request containing a unique value, and determine that the second request corresponds to the first request if the unique value is contained in the second request.

The control unit may be configured to, if the response for the second request is normally received, perform processing of the first request or processing of the response for the second request.

The response for the first request may contain a result of the process regarding the first request or a result of the process regarding the response for the second request.

The second request may be transmitted using a communication method with a higher level of security than a communication method used in transmitting the first request.

The first request may be transmitted using an HTTP method and the second request may be transmitted using an HTTPS method.

The response for the second request may contain an encrypting key and the response for the first request may be encrypted using the encrypting key.

According to a further embodiment of the present disclosure, there is a communication system provided including a first communication device having a predefined URL and a second communication device, wherein the first communication device includes a first communication unit configured to transmit and receive data, and a first control unit configured to transmit a first request via the first communication unit, receive a second request transmitted to the predefined URL via the first communication unit, determine whether the second request corresponds to the first request, transmit a response for the second request according to a result of the determination via the first communication unit, and receive a response for the first request via the first communication unit, and the second communication device includes a second communication unit configured to transmit and receive data, and a second control unit configured to receive the first request via the second communication unit, transmit the second request corresponding to the first request to the predefined URL via the second communication unit, and transmit a response for the first request via the second communication unit if a response for the second request is normally received.

According to a further embodiment of the present disclosure, there is a communication system provided including a first communication device having a predefined first URL and a second communication device having a predefined second URL, wherein the first communication device includes a first communication unit configured to transmit and receive data, and a first control unit configured to transmit a first request via the first communication unit, receive a second request transmitted to the predefined first URL via the first communication unit, determine whether the second request is received from the predefined second URL and corresponds to the first request, transmit a response for the second request according to a result of the determination via the first communication unit, and receive a response for the first request via the first communication unit, and the second communication device includes a second communication unit configured to transmit and receive data, and a second control unit configured to receive the first request via the second communication unit, transmit the second request corresponding to the first request to the predefined first URL via the second communication unit, and transmit a response for the first request via the second communication unit if a response for the second request is normally received.

According to a further embodiment of the present disclosure, there is a communication method provided which is performed by a communication device having a predefined URL, including: transmitting a first request; receiving a second request transmitted to the predefined URL; determining whether the second request corresponds to the first request; transmitting a response for the second request according to a result of the determination; and receiving a response for the first request.

According to a further embodiment of the present disclosure, there is a communication method provided which is performed by a communication device having a predefined first URL, including: transmitting a first request; receiving a second request transmitted to the predefined first URL; determining whether the second request is received from a predefined second URL and corresponds to the first request; transmitting a response for the second request according to a result of the determination; and receiving a response for the first request.

According to a further embodiment of the present disclosure, there is a communication method provided for performing communication with a counterpart device having a predefined URL, including: receiving a first request; transmitting a second request corresponding to the first request to the predefined URL; and transmitting a response for the first request if a response for the second request is normally received.

According to a further embodiment of the present disclosure, there is a computer-readable recording medium provided which records a program for causing a computer to perform the communication method of one of the aforementioned embodiments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

FIG. 1 is a view schematically illustrating the configuration of a communication system according to one embodiment of the present disclosure.

FIG. 2 is a sequence diagram schematically illustrating the flow of a communication method according to one embodiment of the present disclosure.

FIG. 3 is a sequence diagram schematically illustrating the flow of a digital content trade method according to one embodiment of the present disclosure.

MODE FOR THE INVENTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

A preferred embodiment of the present disclosure will now be described in detail with reference to the accompanying drawings in order to make clear the technical idea of the present disclosure. In describing the present disclosure, if it is determined that the specific descriptions on functions or components known in the related art may unnecessarily make obscure the spirit of the present disclosure, the detailed descriptions thereof will be omitted. Components having substantially identical functions and configurations will be designated by like reference numerals and symbols as far as possible, even if the components are illustrated in different drawings. If necessary for the sake of convenience in description, a device and a method will be described together.

FIG. 1 is a view schematically illustrating the configuration of a communication system according to one embodiment of the present disclosure. Referring to FIG. 1, the communication system according to one embodiment of the present disclosure includes a first communication device 110 and a second communication device 120 which communicate with each other. The first communication device 110 includes a communication unit 130 and a control unit 140. The second communication device 120 includes a communication unit 150 and a control unit 160. The respective communication units 130 and 150 are configured to transmit and receive data via a network such as the Internet or the like. The respective control units 140 and 160 are configured to process the data transmitted and received by the respective communication units 130 and 150. Detailed operations of the first communication device 110 and the second communication device 120 will be described below with reference to FIG. 2.

FIG. 2 is a sequence diagram schematically illustrating the flow of a communication method according to one embodiment of the present disclosure. Referring to FIG. 2, the first communication device 110 has a predefined URL and transmits a first request to the second communication device 120. Typically, a communication device which has received a communication request sends a response to a device that has transmitted the communication request. In the case where a malicious third party transmits a communication request, a communication device sends a response to the malicious third party. However, in the present disclosure, the second communication device 120 transmits a second request to the predefined URL prior to sending a response for the first request, thereby verifying that the first request is transmitted by the first communication device 110 (Step 220). The first communication device 110 determines whether the second request received from the second communication device 120 is for verifying whether the first request is transmitted by the first communication device 110 itself. If the second request is directed to the first request transmitted by the first communication device 110, the first communication device 110 normally sends a response for the second request to the second communication device 120 (Step 230). If the second request is not directed to the first request transmitted by the first communication device 110, the first communication device 110 performs error handling. If the response for the second request is normally received from the first communication device 110, the second communication device 120 sends a response for the first request to the first communication device 110 (Step 240). If the second communication device 120 fails to normally receive a response for the second request from the first communication device 110, for example, if the second communication device 120 does not receive any response from the first communication device 110 or if the second communication device 120 receives an error signal from the first communication device 110, the second communication device 120 determines the first request to be an abnormal request and performs error handling.

In this case, the second communication device 120 does not transmit the second request to a device that has transmitted the first request but transmits the second request to the URL of the first communication device 110. Therefore, if the first request is transmitted by a third party, the third party cannot normally communicate with the second communication device 120. Accordingly, the first communication device 110 and the second communication device 120 can safely perform communication even when they use a communication method having no security or low security. This makes it very easy to build and manage a communication system thereof. For example, communication can be performed by HTTP which is a non-secure protocol. Since an HTTP communication system can be easily implemented by a low-level developer, it is not necessary to employ a high-level developer. A great deal of cost and time can be saved in building and maintaining a communication system.

In one embodiment of the present disclosure, the first communication device 110 may transmit a first request containing a unique value to the second communication device 120. The second communication device 120 may transmit a second request containing the unique value of the received first request to the first communication device 110. The first communication device 110 may determine whether the second request is directed to the first request transmitted by the first communication device 110 itself, by verifying that the unique value contained in the second request is identical with the unique value of the first request transmitted by itself. For example, the first request and the second request may have the following JSON (Java Script Object Notation) values.

First request: {"invokeKey": a unique value}
Second request: {"invokeKey": the unique value contained in the first request}

In one embodiment of the present disclosure, the second communication device 120 also has a predefined URL. The first communication device 110 can determine whether the second request is received from the predefined URL of the second communication device 120. Specifically, if the second request is received from the predefined URL of the second communication device 120 and if the second request corresponds to the first request transmitted by the first communication device 110, the first communication device 110 normally sends a response for the second request. If not, the first communication device 110 may perform error handling. In this case, even when a malicious third party acquires the unique value contained in the first request and transmits a counterfeit second request, the first communication device 110 determines that the second request is not transmitted from the second communication device 120, thereby performing error handling. This makes it possible to perform communication in a safer manner.

In this case, examining a URL of a received request is considered a high-level technique which may require a lot of time and effort to implement. This high-level technique needs to be implemented only in the first communication device 110 and need not be implemented in the second communication device 120. Thus, the burden of development is reduced. If a business entity of the first communication device 110 differs from a business entity of the second communication device 120, the business entity of the second communication device 120 has no burden of development at all. Therefore, the present disclosure is particularly useful in business-to-business (B2B) transaction. In case of the B2B transaction, URLs of communication devices of both business entities are fixed in most cases. Thus, the present disclosure is suitable for use in the B2B transaction.

In one embodiment of the present disclosure, the first request may contain a process-inquiring command. The second communication device 120 may perform the process regarding the first request only when the response for the second request is normally received.

In one embodiment of the present disclosure, the first communication device 110 may transmit a process-inquiring command by putting it in the response for the second request. In this case, the second communication device 120 may perform the process regarding the response for the second request only when the response for the second request is normally received.

In one embodiment of the present disclosure, the second communication device 120 may transmit the response for the first request which contains a result of the process regarding the first request or a result of the process regarding the response for the second request.

In one embodiment of the present disclosure, the second request may be transmitted using a communication method with a higher level of security than a communication method of the first request. For example, the first request may be transmitted using HTTP and the second request may be transmitted using HTTPS. In this case, the technique of implementing a server for a secure protocol such HTTPS or the like is a high-level technique. However, such a server for a secure protocol may be implemented only in the first communication device 110. Thus, no burden is carried in developing and maintaining the second communication device 120.

In one embodiment of the present disclosure, the first communication device 110 transmits a process-inquiring command by putting it in the response for the second request which is highly secured. This makes it possible to perform communication in a safer manner.

In one embodiment of the present disclosure, the first communication device 110 may transmit an encrypting key by putting it in the response for the second request which is highly secured. The second communication device 120 may encrypt the response for the first request using the encrypting key. This makes it possible to perform communication in a safer manner.

The present disclosure may be applied to all application fields which require communication security. For example, the present disclosure may be applied to a commodity trade and sales agency service, a secondary information providing service using a digital content, a price comparison service, a commodity recommendation service, an auction service, a reservation agency service, a knowledge service using a digital content (e.g., a service for obtaining patient information and presenting a health plan), an electronic payment service, a game item trading service, and so forth. Hereinafter, descriptions will be made on an embodiment regarding a digital content trade agency service.

FIG. 3 is a sequence diagram schematically illustrating the flow of a digital content trade method according to one embodiment of the present disclosure. Referring to FIG. 3, a user 310 transmits a request for trade of a digital content to a trade server 110 (Step 320). The trade server 110 transmits an invoke signal, which indicates the existence of a command and which contains an invokeKey value, to a pre-registered address of a content server 120 using an HTTP non-secure protocol (Step 330). In order to identify the kind of the command, the content server 120 transmits a GetCmd request, which contains the received invokeKey value, to a pre-registered address of the trade server 110 using an HTTPS secure protocol (Step 340). Since the content server 120 transmits the GetCmd request to a predefined address, the GetCmd request arrives at the trade server 110 even when an invoke signal comes from an external counterfeit address. Thus, an external malicious server cannot communicate with the content server 120.

The trade server 110 performs domain IP examination in order to confirm that the received GetCmd request has come from the content server 120 (Step 350). If the GetCmd request has come from a registered IP and if the invokeKey value of the GetCmd request is identical with the invokeKey value transmitted by the trade server 110 itself, the trade server 110 sends a command corresponding to the user's request to the content server 120 in response to the GetCmd request. The trade server 110 generates an encrypting key for the protection of an HTTP response value of the content server 120 and sends the encrypting key along with the command to the content server 120 (Step 360). At this time, the encrypting key is delivered using an HTTPS secure protocol and, therefore, is not exposed to outside.

If the invokeKey value of the GetCmd request is not identical with the invokeKey value transmitted by the trade server 110, the trade server 110 performs error handling. In this case, the content server 120 determines that the invoke signal is not a normal request. Thus, the content server 120 may send an error signal to a malicious server. If the GetCmd request has not come from a registered IP, the trade server 110 performs error handling. Accordingly, if a third party fabricates an HTTPS header and falsely transmits a GetCmd request to the trade server 110, the false transmission is filtered in the IP examination and the trade server 110 performs error handling.

If the content server 120 normally receives the command and the encrypting key, the content server 120 processes the command and encrypts the process result using the encrypting key (Step 370). The content server 120 delivers the encrypted process result to the trade server 110 in a JSON structure (Step 380). At this time, the information delivered from the content server 120 to the trade server 110 is encrypted and, therefore, is not exposed to outside even if the information is delivered using an HTTP non-secure protocol. The trade server 110 decrypts the process result using the encrypting key, and outputs the process result to the user 310 (Step 390).

The digital content trade method according to one embodiment of the present disclosure makes it inherently impossible to counterfeit or falsify the data of the content server 120 using a counterfeiting/falsifying protocol through protocol hijacking other than physical sever hacking. It is necessary for the content server 120 to merely implement an HTTP server without having to implement an HTTPS server or an IP examination function. Even in the case where a digital content holder is a small entity that has an insufficient security technique or feels cost burdensome, the digital content holder has not burden in building and managing a system and can easily and quickly use various kinds of services in a safe manner.

The aforementioned exemplary structures according to the present disclosure may be implemented in different forms such as program commands executed by a processor, a software module, a micro code, a computer program product recorded in a recoding medium readable by a computer (including a device having an information processing function), logic circuits, an application-specific integrated circuit, firmware, and so forth. Examples of the computer-readable recording medium include a ROM, a RAM, a CD, a DVD, a magnetic tape, a hard disk, a floppy disk, and an optical data storage device. The computer-readable recording medium may include the one realized in the form of a carrier wave (e.g., transmission through the Internet). In addition, the computer-readable recording medium may be dispersed in computer systems connected via a network. Codes readable by a computer in a dispersed manner may be stored in and executed by the computer-readable recording medium.

The present disclosure has been described in detail based on the preferred embodiments as illustrated in the drawings. These embodiments are not intended to limit the present disclosure but are nothing more than examples. Thus, the present disclosure needs to be considered from an explanatory viewpoint and not from a limitative viewpoint. The genuine technical protection scope of the present disclosure shall be defined by the technical concept of the appended claims and not by the foregoing descriptions. While specific terms are used herein, these terms are used merely for the purpose of describing the concept of the present disclosure and are not used in limitative meanings to limit the scope of the present disclosure recited in the claims. Accordingly, it will be understood by a person having an ordinary knowledge in the field to which the present disclosure pertain that various modifications and other equivalent embodiments may be made without departing from the scope and spirit of the present disclosure. It is to be understood that equivalents include not only the equivalents well-known at the present time but also the equivalents to be developed in the future, namely all constituent elements that will be invented so as to perform similar functions regardless of structures.

The invention claimed is:

1. A communication system for performing communications with a counterpart communication device whose uniform resource locator (URL) is fixed and pre-registered, the communication system comprising:

a communication device having a transmitter and a receiver configured to transmit and receive data; and a processor configured to:

transmit a first request via the communication device whose URL is fixed and pre-registered;

prior to receiving a response for the first request, receive, via the communication device, a second request that is transmitted to the pre-registered fixed URL of the communication device from the counterpart communication device;

determine whether the received second request is received from the pre-registered fixed URL of the counterpart communication device;

determine whether the received second request is directed to the first request transmitted by the communication device;

based on determining that the received second request is received from the pre-registered fixed URL of the counterpart communication device and the received second request is directed to the first request transmitted by the communication device, normally transmit a response for the second request via the communication device, and receive the response for the first request via the communication device after normally transmitting the response for the second request; and based on determining that the received second request is not received from the pre-registered fixed URL of the counterpart communication device or the received second request is not directed to the first request transmitted by the communication device, perform error handling.

2. The communication system of claim 1, wherein the processor is further configured to:
   transmit the first request containing a unique value, and
   determine that the second request is directed to the first request if the unique value is contained in the second request.

3. The communication system of claim 1, wherein the second request and the response for the second request are transmitted using a communication method with a higher level of security than a communication method used in transmitting the first request and the response for the first request.

4. The communication system of claim 3, wherein the first request and the response for the first request are transmitted using HTTP and the second request and the response for the second request are transmitted using HTTPS.

5. The communication system of claim 3, wherein the response for the second request contains an encrypting key and the response for the first request is encrypted using the encrypting key.

6. A communication method in a communication device whose uniform resource locator (URL) is fixed and pre-registered, the method comprising:
   transmitting a first request;
   prior to receiving a response for the first request, receiving a second request that is transmitted to the pre-registered fixed URL of the communication device from a counterpart communication device whose URL is fixed and pre-registered;
   determining whether the received second request is received from the pre-registered fixed URL of the counterpart communication device;
   determining whether the received second request is directed to the first request transmitted by the communication device;
   based on determining that the received second request is received from the pre-registered fixed URL of the counterpart communication device and the received second request is directed to the first request transmitted by the communication device, normally transmitting a response for the second request, and receiving the response for the first request after normally transmitting the response for the second request; and
   based on determining that the received second request is not received from the pre-registered fixed URL of the counterpart communication device or the received second request is not directed to the first request transmitted by the communication device, performing error handling.

7. A non-transitory computer-readable recording medium which records a program for performing the communication method of claim 6.

\* \* \* \* \*